United States Patent
Earle et al.

(10) Patent No.: US 10,936,488 B1
(45) Date of Patent: Mar. 2, 2021

(54) INCIDENT RESPONSE IN AN INFORMATION TECHNOLOGY ENVIRONMENT USING CACHED DATA FROM EXTERNAL SERVICES

(71) Applicant: Splunk Inc., San Francisco, CA (US)

(72) Inventors: Brian Robert Earle, Sunnyvale, CA (US); Atif Mahadik, Freemont, CA (US); Govind Salinas, Sunnyvale, CA (US); Sourabh Satish, Freemont, CA (US)

(73) Assignee: Splunk Inc., San Francisco, CA (US)

( * ) Notice: Subject to any disclaimer, the term of this patent is extended or adjusted under 35 U.S.C. 154(b) by 21 days.

(21) Appl. No.: 16/119,773

(22) Filed: Aug. 31, 2018

(51) Int. Cl.
*G06F 11/07* (2006.01)
*G06F 12/0804* (2016.01)

(52) U.S. Cl.
CPC ...... *G06F 12/0804* (2013.01); *G06F 11/0709* (2013.01); *G06F 11/0751* (2013.01); *G06F 11/0787* (2013.01); *G06F 2212/1021* (2013.01); *G06F 2212/1024* (2013.01)

(58) Field of Classification Search
None
See application file for complete search history.

(56) References Cited

U.S. PATENT DOCUMENTS

| | | | | |
|---|---|---|---|---|
| 9,203,755 B1* | 12/2015 | Wong | ................. | H04L 43/0829 |
| 10,185,822 B2* | 1/2019 | Viscuso | ................ | G06F 21/554 |
| 10,262,023 B1* | 4/2019 | Kuang | ................... | G06F 16/13 |
| 10,565,372 B1* | 2/2020 | Stickle | .................... | G06F 12/14 |
| 2002/0138589 A1* | 9/2002 | Al-Kazily | ............... | H04L 29/06 709/217 |
| 2003/0115420 A1* | 6/2003 | Tsirigotis | ............ | G06F 16/9574 711/133 |
| 2004/0267479 A1* | 12/2004 | Querbach | .......... | G01R 31/3176 702/117 |
| 2005/0223368 A1* | 10/2005 | Smith | ................. | G06F 11/3636 717/128 |
| 2012/0110374 A1* | 5/2012 | Brewerton | .......... | G06F 11/0739 714/5.11 |
| 2013/0080684 A1* | 3/2013 | Ha | ........................ | G06F 3/0611 711/103 |
| 2013/0185488 A1* | 7/2013 | Talagala | .............. | G06F 12/0246 711/103 |
| 2014/0201307 A1* | 7/2014 | Banavalikar | .......... | H04L 45/742 709/213 |
| 2014/0351629 A1* | 11/2014 | Ware | ..................... | G11C 29/42 714/6.13 |

(Continued)

*Primary Examiner* — Sean D Rossiter
*Assistant Examiner* — Stephanie Wu
(74) *Attorney, Agent, or Firm* — Nicholson De Vos Webster & Elliott LLP (57) ABSTRACT

Described herein are systems, methods, and software to improve incident response in an information technology (IT) environment. In one example, an incident service executes a course of action with one or more actions to respond to an incident in the IT environment. During execution, the incident service identifies a request to obtain data from an external service outside of the IT environment and determines whether the data is cached in a data store for the IT environment. If cached, the incident service obtains the data for the action from the data store. In contrast, if the data is not cached, the incident service obtains the data for the action from the external service.

24 Claims, 6 Drawing Sheets

(56) References Cited

U.S. PATENT DOCUMENTS

| | | | |
|---|---|---|---|
| 2015/0074685 A1* | 3/2015 | Baeuerle | G06F 9/542 |
| | | | 719/318 |
| 2015/0318059 A1* | 11/2015 | Dragula | G11C 29/52 |
| | | | 714/719 |
| 2016/0072836 A1* | 3/2016 | Hadden | H04L 63/1441 |
| | | | 726/23 |
| 2016/0188394 A1* | 6/2016 | Schumacher | G06F 11/0712 |
| | | | 714/49 |
| 2016/0226895 A1* | 8/2016 | Huang | H04L 63/1416 |
| 2016/0357627 A1* | 12/2016 | Aljuffri | H03M 13/1575 |
| 2017/0149924 A1* | 5/2017 | Peterson | H04L 67/2852 |
| 2019/0171512 A1* | 6/2019 | Petrini | G06F 11/0793 |

* cited by examiner

INCIDENT RESPONSE IN AN INFORMATION TECHNOLOGY ENVIRONMENT USING CACHED DATA FROM EXTERNAL SERVICES

TECHNICAL BACKGROUND

Information technology (IT) environments often employ various computing components, both physical and virtual, to provide desired operations. These computing elements may include end user computing devices, host computing devices, virtual machines, switches, routers, firewalls, and the like. To maintain efficient and effective operations of the IT environment, incident response services may be employed that can respond to various incidents within the IT environment. These incidents may include or be associated with viruses, malware, spyware, denial of service attacks, phishing attacks, server crashes, device failures, power outages, unknown communications, or some other similar incident.

However, while incident response services provide response operations to incidents within the IT environment, difficulties arise as the size and complexity of the IT environment increases. These difficulties are often compounded when the new computing components provide different operations and are configured with varying hardware and software configurations. Further, the increasing number computing components in combination with limited administrative personnel and resources can make it difficult to manage the investigation and remediation of incidents in the environment. Even with ample administrators or analyst users, it can be cumbersome to coordinate the investigation and remediation efforts.

OVERVIEW

The technology described herein improves the response to incident in an information technology (IT) environment by locally caching data from external services. In one implementation, a method includes initiating execution of a course of action, wherein the course of action comprises one or more steps to respond to an incident in an IT environment and identifying a step in the one or more steps that obtains data from a service based on at least one attribute of the incident. The method further includes determining when the data is cached in a data store for the IT environment based on the at least one attribute. The method also provides, when the data is cached in the data store, obtaining the data for the step from the data store, and when the data is not cached in the data store, obtaining the data for the step from the external service.

DETAILED DESCRIPTION

Figure 1:
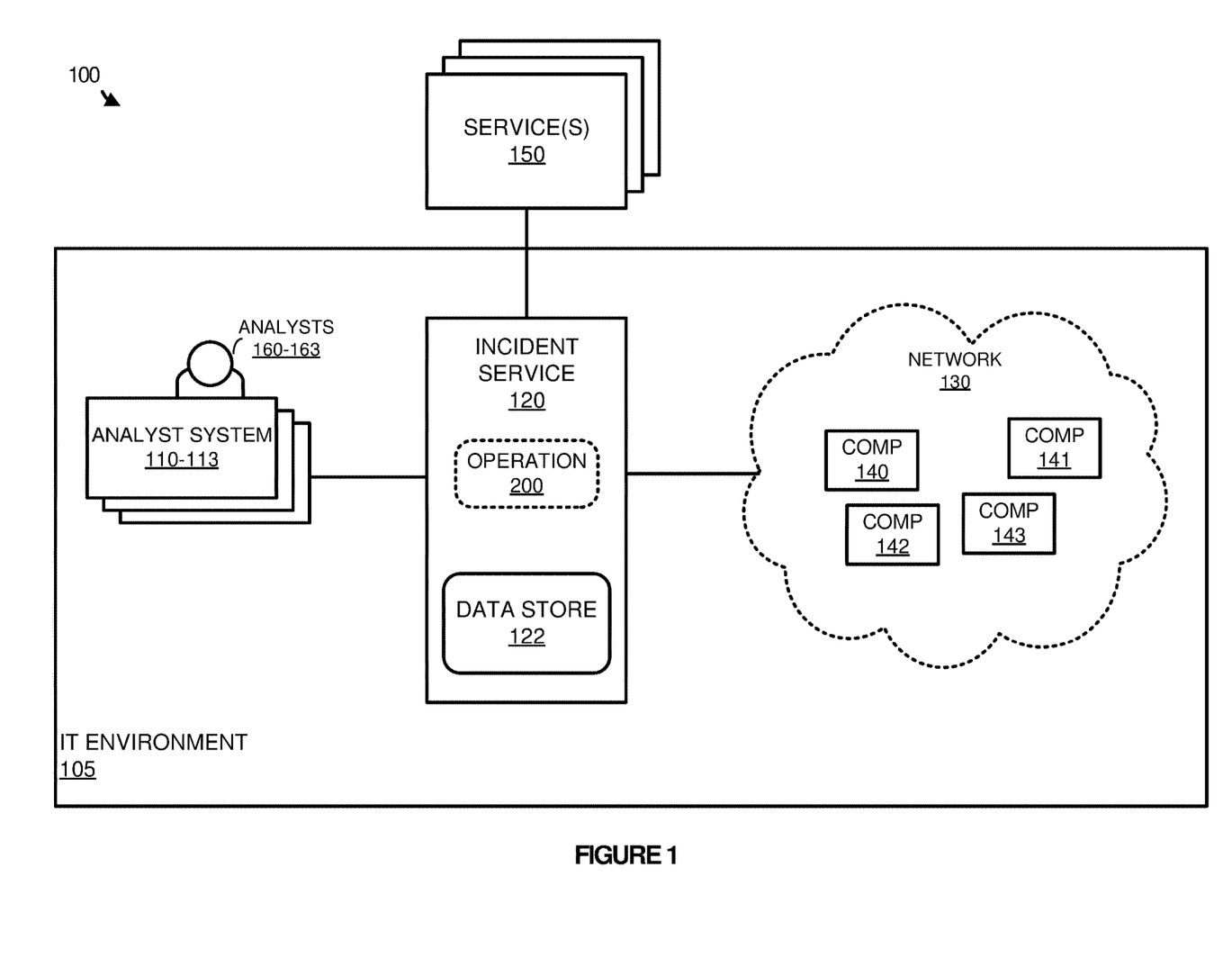
FIG. 1 illustrates computing environment for incident response according to an example.

FIG. 1 illustrates a computing environment 100 according to an example. Computing environment 100 includes information technology (IT) environment 105 and service(s) 150. IT environment 105 further includes analyst systems 110-113, incident service 120 representative of an example incident response system, and components 130. Analyst systems 110-113 may comprise smartphones, tablets, laptop computers, desktop computers, or some other similar computing device associated with a corresponding analyst of analysts 160-163. Network 130 includes components 140-143 that may comprise physical computing systems, virtual computing systems, routers, switches, firewalls, or some other similar types of computing elements, including combinations thereof. Incident service 120 provides operation 200 that is further described in FIG. 2, and further includes data store 122 for caching data from service(s) 150, wherein service(s) 150 correspond to websites and databases outside of the IT environment capable of providing supplementary information for incidents identified in network 130 of IT environment 105.

In operation, components 140-143 function in network 130 to provide various services and functionality. The services and functionality may include operations for performing as an end user computing system, a server computing system, a host for one or more virtual machines, a virtual machine itself, a switch, a router, or some other similar operation in the IT environment. During the operation of the computing assets, the assets may encounter incidents that can subject the network to the loss of data, interruption in services, or some other similar incident. These incidents may include or be associated with viruses, malware, spyware, denial of service attacks, phishing attacks, server crashes, device failures, power outages, or other similar incidents.

In some implementations, to identify the incidents in network 130 of IT environment 105, incident service 120 may implement security information and event management (SIEM) services and/or a monitoring and analytics services that are used to automate the identification of incidents within IT environment 105. In other implementations, while not illustrated in the example of IT environment 105, incident service may be coupled to a SIEM service or other monitoring and analytics service capable of identifying incidents in the environment and providing information about the incident as a notification to incident service 120. As an example, if an unknown process were operating on component 140, a SIEM service may identify the incident and provide information about the incident as a notification to incident service 120. The information may include information about the name of the unknown process, the source of the process, any credential or licensing information for the unknown process, or any other similar information about the process. In some implementations, in addition to or in place of the automated identification of incident in IT environment 105, IT environment 105 may employ a "ticket" system, wherein users and analysts of the environment may report incidents. For example, when an email is received from an unknown source seeking personal information, the receiving user of the email may report the email as an incident such that incident service 120 may process the incident. When reported, the end user may provide information about the incident, however, automated processes may identify additional information for the incident, such as a source domain for the email, specific content or links within the email, or some other similar information that may assist incident service 120 in responding to the incident.

Here, once an incident is identified in network 130, incident service 120 determines an incident response or course of action that corresponds to the incident. In some implementations, incident service 120 may maintain or access incident responses that correspond to a sequence or sequences of one or more steps that can be used to mitigate, monitor, remove, or provide any other similar operations to remediate or correct the incident. As an example, when an incident is identified, incident service 120 may identify attributes or traits of the incident and determine an incident type associated with the incident. This incident type may be based on whether the incident is a virus, malware, spyware, a denial of service attack, a phishing attack, a server crash, a device failure, a power outage, or any other similar incident, and may further be based on user affected in the environment, the components affected in the environment, or some other similar information. For example, a first type of incident may be associated with unknown IP addresses encountered by a firewall as opposed to unknown IP addresses encountered at an end computing system. Once the threat type is identified, incident service 120 may determine at least one incident response to respond to the incident, wherein the at least one incident response may be implemented as part of an automated process or may be provided to an analyst at analyst systems 110-113 to verify and/or provide feedback regarding the identified response.

In the present implementation, when an incident response or course of action is implemented by incident service 120, the response may require that supplemental information or data is obtained from service(s) 150, wherein service(s) 150 correspond to websites and databases that provide information about IP addresses, domain names, file reputation, or some other similar information. As an example, a step in an incident response may request a website service about reputation information corresponding to an unknown file identified in network 130. The reputation information may include a score or rating indicative of whether the file is considered harmful, may provide information about the geographic source of the file, or may provide any other information about the file. However, while the websites and databases may provide various supplemental information about the incidents as part of a course of action, data store 122 may provide an efficient caching service to limit latency and network costs associated with obtaining data for each incident response.

Figure 2:
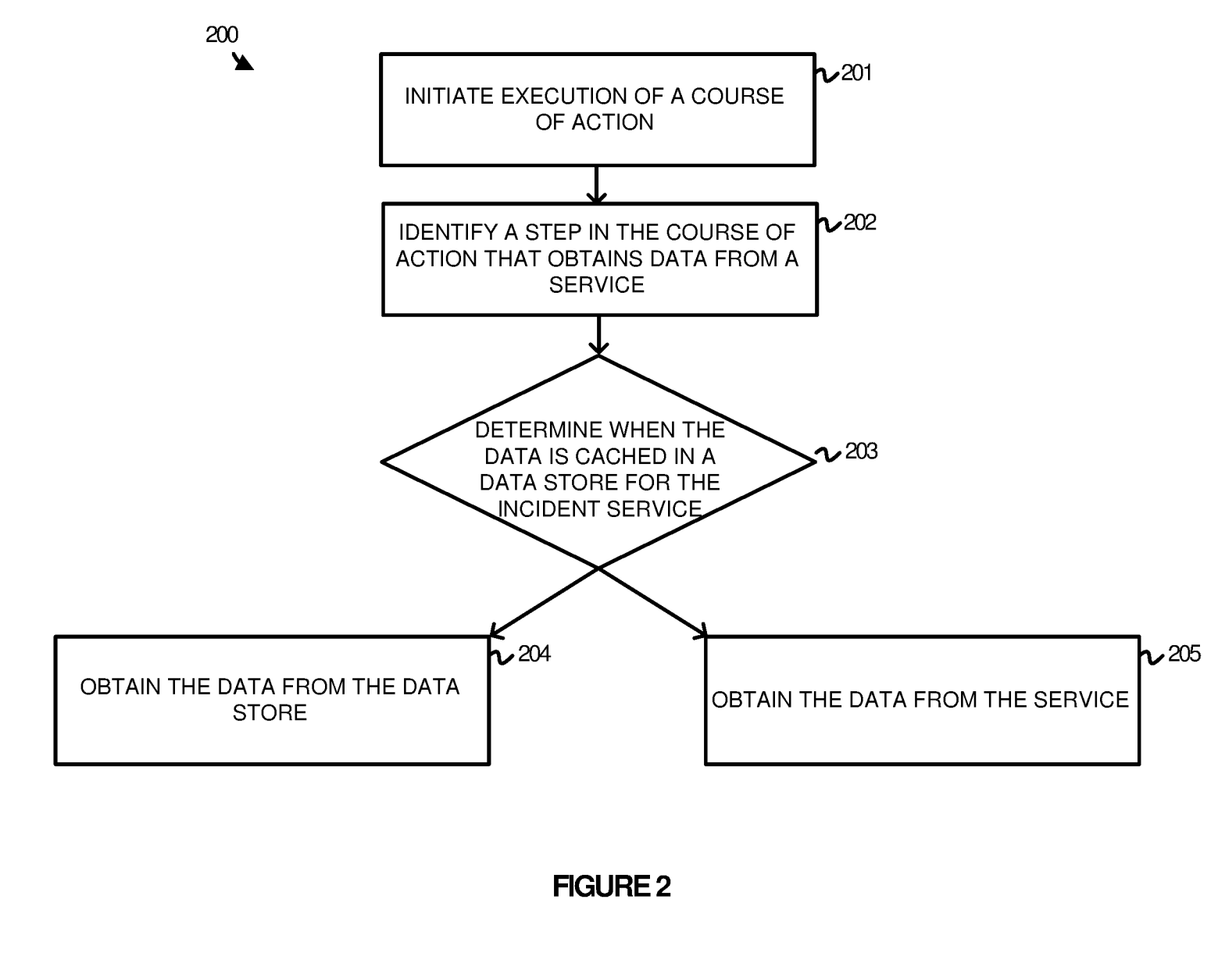
FIG. 2 illustrates an operation of an incident service according to an example.

FIG. 2 illustrates an operation 200 of an incident service according to an implementation. The functions of operation 200 are referenced parenthetically in the paragraphs that follow with reference to systems and elements of computing environment 100 of FIG. 1.

As depicted, operation 200 includes initiating (201) execution of a course of action to respond to an incident in network 130 of IT environment. In some implementations, incident service 120 may identify the incident via a monitoring service executing as part of incident service 120, however, a notification may be provided to incident service 120 by an external analysis and monitoring service or by a ticket system where users and analysts in the environment may provide a notification of the incident. In response to the incident, incident service 120 may use automated operations to identify a course of action or courses of action to respond to the incident or may provide information about the incident to an analyst, wherein the analyst may select a course of action to respond to the incident.

Here, once a course of action is initiated, operation 200 further identifies (202) a step in the course of action that obtains data from an external service outside of the IT environment. In some implementations, the external service may comprise a website or other database capable of providing supplementary information for the incident over the internet. In identifying the step, the step may be associated with metadata, may include function calls capable of interacting with the external service, or may include or correspond to information that permits incident service 120 to identify a requirement of an outside service. Once a step is identified, operation 200 further determines (203) when the data requested by the step is cached in a data store for the IT environment and incident service 120. In particular, rather than requiring the data to be obtained over the internet, data store 122 may be located on the same computing system or systems that provide incident service 120, permitting the data to be obtained without a query to the designated service.

In some implementations, in identifying whether the data is in data store 122, one or more attributes associated with the incident, and used in generating the query of the external service, may be searched in data store 122 to determine whether the data is locally cached in data store 122. As an example, a service may provide geographic location information for IP addresses. Consequently, the attribute associated with the step may comprise an IP address associated with a communication of interest related to the incident. Using the IP address, incident service 120 may search data store 122 to determine whether the required data has been cached in data store 122. Other attributes that may be searched may include domain names, file extensions, file names, or some other similar attribute that is provided to an external service to obtain additional information for the incident. In some embodiments, in addition to the attributes of the incident used in the query of the external service, incident service 120 may further determine a service identifier associated with the requested service. In particular, multiple services may be associated with the same attributes. For example, a first service may provide geolocation information related to an IP address, while a second service may provide reputation information for the IP address. As a result, incident service 120 may determine a service identifier to ensure that the proper data associated with the step is identified in data store 122.

After determining when the data requested by the step is cached in data store 122, operation 200 further obtains (204) the data from the data store when the data is cached in the data store and obtains (205) the data from the external service when the data is not cached in the data store. In some implementations, when the data is not cached in the data store, incident service 120 may determine whether to cache the newly obtained data from the external service. This caching may be automatic (e.g. new data obtained from service(s) 150 is automatically cached), may be cached when the data is obtained from external services, may be cached when the cache is at a threshold capacity, may be cached based on the data type returned from the external service, or may be cached based on any other similar criteria.

In some implementations, incident service 120 may further determine when to purge or erase cached data items in data store 122. This purging or erasing of data from data store 122 may be based on a timeout associated with the data, a request to purge the data from an analyst or other administrator, an access frequency for the data failing to meet a threshold frequency, or some other similar purging event.

Figure 3:
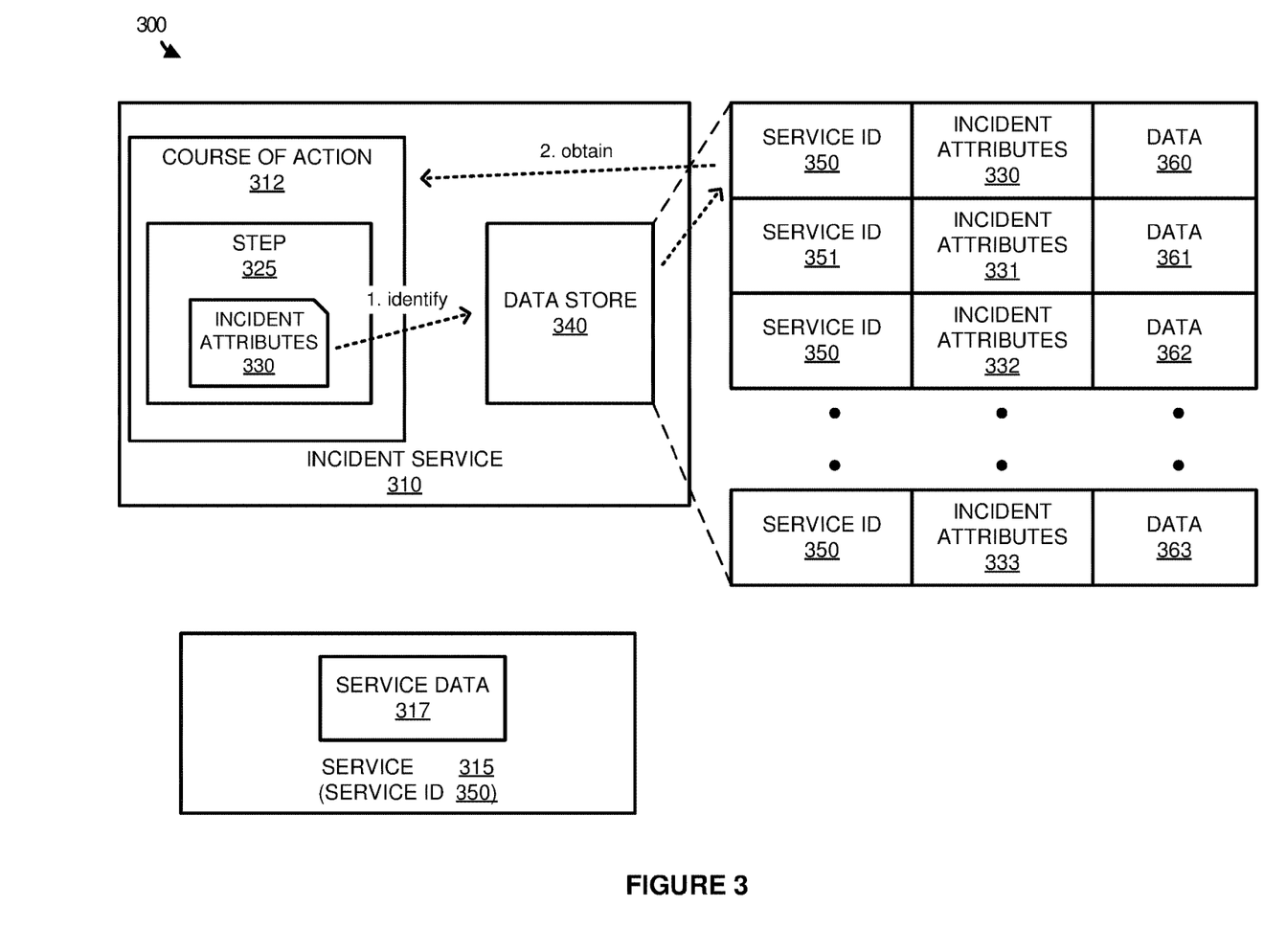
FIG. 3 illustrates an operational scenario of obtaining cached data from a data store according to an example.

FIG. 3 illustrates an operational scenario 300 of obtaining cached data from a data store according to an implementation. Operational scenario 300 includes incident service 310, service 315, and data store 340. Data store 340 further associates service identifiers (IDs) 350-351 and incident attributes 330-333 with data 360-363. Incident service 310 further executes course of action 312, wherein course of action 312 includes at least step 325 with incident attributes 330.

In operation, incident service 310 initiates course of action 312 to respond to an incident in an IT environment. Course of action 312 may be an automated course of action that is initiated when the incident is identified by incident service 310 or may be initiated in response to selection of the course of action by an analyst for the IT environment. Course of action 312 may comprise one or more steps arranged in one or more sequences to respond to the incident in the IT environment, wherein the one or more steps may identify supplemental information about the incident, monitor the incident, modify a configuration of a component in the IT environment, or provide some other similar step. In some implementations, in defining a course of action, an analyst may be provided with an interface wherein the analyst may generate a flow diagram for the various steps that operate as part of the course of action. These steps may each correspond to instructions (software, firmware, or other similar instructions) capable of implementing the desired operation. Using the example of step 325, the step may correspond to instructions capable of generating a request to the external service and obtaining the required data from the external service.

During the execution of course of action 312, step 325 may generate a query destined for service 315, wherein service 315 may comprise a website or other database accessible to incident service 310 over the internet. In response to the execution of step 325, incident service 310 may first identify or determine, at step 1, whether data store 340 includes the desired information.

In some implementations, to identify steps that require interaction with an external service, incident service 310 may identify outgoing communication requests to the external service from the step, may identify metadata associated with the step indicating the request for the external service, or may identify any other relevant indicator associated with a request to an external service. Once the step is identified that requires data from the outside service, incident service 310 may determine whether the data is cached in data store 340. In some implementations, data store may associate a service ID and incident attributes with corresponding data values. Here, step 325 uses incident attributes 330 to request data from the external service 315. As a result, incident service 310 may determine whether data is cached in data store 340 that corresponds to service ID 350 (corresponding to service 315) and incident attributes 330. Consequently, because an entry corresponds service ID 350 and incident attributes 330, incident service 310 may return data 360 from data store 340 to support the request. Once provided, course of action 312 may implement one or more additional steps in accordance with data 360.

In some implementations, in identifying the external service required by the step, incident service 310 may identify the service ID based on the domain associated with the data request, based on metadata provided as part of step 325, based on the service ID provided as part of the request in step 325, or identified in any similar manner. As an example, when step 325 is executed, incident service 310 may identify a request to a domain associated with service 315 and use the domain to identify service ID 350. Once the service ID and incident attributes are identified, incident service 310 may determine if the required data is cached in data store 340.

Figure 4:
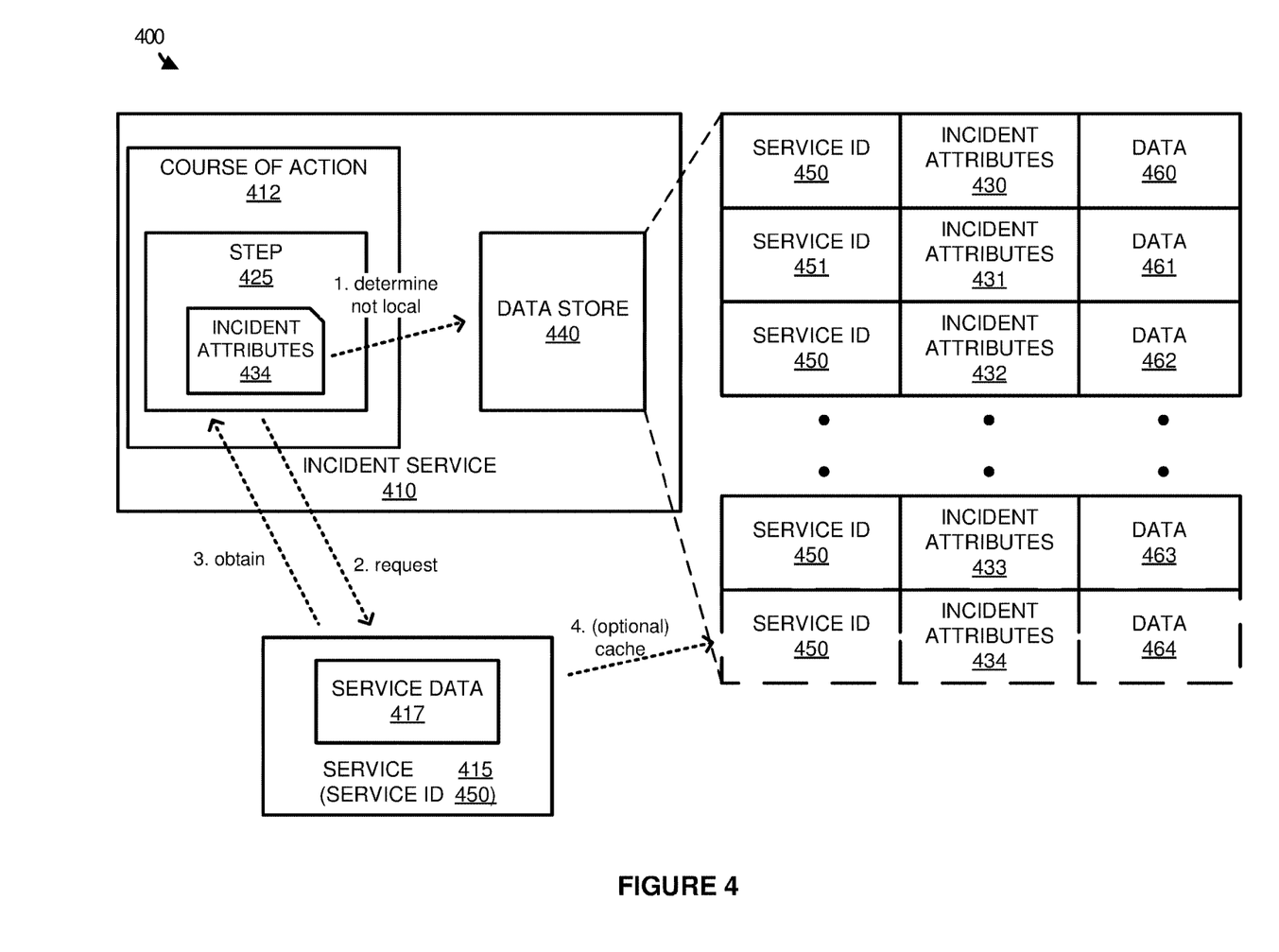
FIG. 4 illustrates an operational scenario of obtaining data from an external service according to an example.

FIG. 4 illustrates an operational scenario 400 of obtaining data from an external service according to an example. Operational scenario 400 includes incident service 410, service 415, and data store 440. Data store 440 further associates service identifiers (IDs) 450-451 and incident attributes 430-434 with data 460-464. Incident service 410 further executes course of action 412, wherein course of action 412 includes at least step 425 with incident attributes 430.

In operation, incident service 410 initiates course of action 412 to respond to an incident in an IT environment. Course of action 412 may be an automated course of action that is initiated when the incident is identified by incident service 410 or may be initiated in response to selection of the course of action by an analyst for the IT environment. Course of action 412 may comprise one or more steps arranged in one or more sequences to respond to the incident in the IT environment, wherein the one or more steps may identify supplemental information about the incident, monitor the incident, modify a configuration of a component in the IT environment, or provide some other similar operation. During the execution of course of action 412, step 425 may generate a query destined for service 415, wherein service 415 may comprise a website or other database accessible to incident service 410 over the internet. In response to the execution of step 425, incident service 410 may first identify or determine, at step 1, that data store 440 does not include the required information for step 425. In particular, because incident attributes 434 cannot be identified within data store 440, incident service 410 may be required to request, at step 2, and obtain, at step 3, the required data from service data 417 of service 415. Once obtained, course of action 412 may process the data in accordance with any other steps of the course of action.

In some implementations, in addition to obtaining the data for the current course of action, incident service 410 may further cache, at step 4, the obtained data such that the data may be used during a second execution of course of action 412, or some other course of action that queries service 415. For example, if a second course of action included step 425 to obtain information about incident attributes 434, then the second course of action may identify the relevant data 464 from data store 440 using incident attributes 434 and service ID 450. In this manner, incident service 410 may improve latency in determining supplemental information, may limit costs incurred by querying an external service, or may provide control over the quantity of outgoing connections are required to respond to security incidents.

In some implementations, in determining whether to cache data from service 415, incident service 410 may determine whether the newly obtained data meets caching criteria. This caching criteria may comprise a data type of interest to be cached in data store 440, may comprise service identifier information for services that qualify to be cached in data store 440, may comprise analyst identifier information for analysts who qualify for data to be cached in data store 440, or may comprise any other similar criteria including combinations thereof. As an example, incident service 410 may be configured such that geolocation information should be cached in data store 440. As a result, when a geolocation service is invoked using a step, incident service 410 may cache the data obtained from the geolocation service. In contrast, if a file reputation service is invoked using a step, incident service 410 may determine that the obtained data does not meet the criteria for data store 440 and prevent the caching of the data in data store 440.

Although demonstrated in the example of FIG. 4 as adding data 464, service ID 450, and incident attributes 434 to data store 440 without removing other data objects in data store 440, incident service 410 may erase or purge other data items in data store 440 to provide cache space for the newly identified data.

Figure 5:
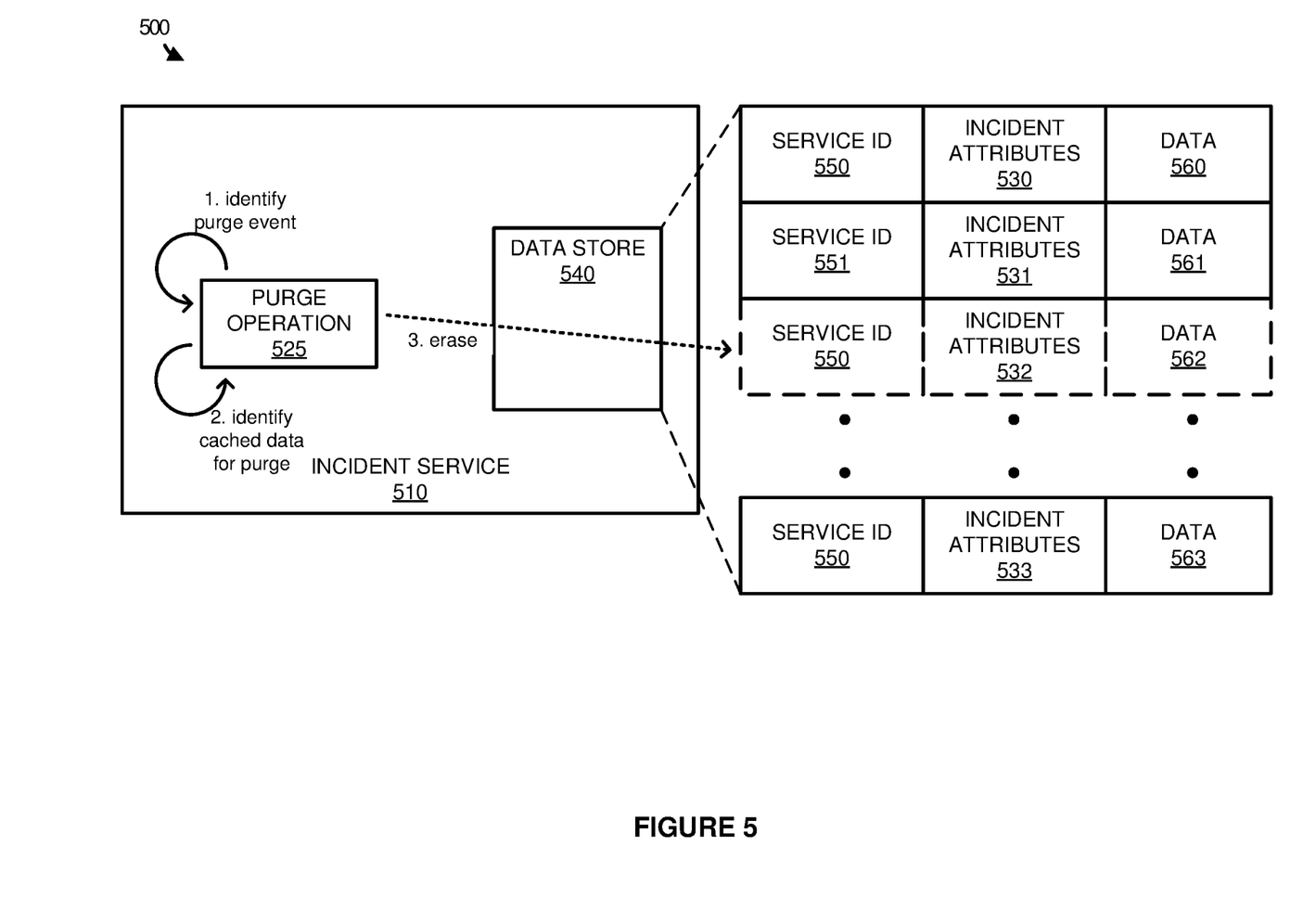
FIG. 5 illustrates an operational scenario of purging data from a data store according to an example.

FIG. 5 illustrates an operational scenario 500 of purging data from a data store according to an example. Operational scenario 500 includes incident service 510 with data store 540. Data store 540 further associates service identifiers (IDs) 550-551 and incident attributes 530-533 with data 560-563. Incident service 510 further executes purge operation 525 capable of purging data from data store 540.

In operation, incident service 510 initiates courses of action to respond to incidents in an IT environment. Each course of action may comprise an automated course of action that is initiated when the incident is identified by incident service 510 or may be initiated in response to selection of the course of action by an analyst for the IT environment. Each may comprise one or more steps arranged in one or more sequences to respond to the incident in the IT environment, wherein the one or more steps may identify supplemental information about the incident, monitor the incident, modify a configuration of a component in the IT environment, or provide some other similar step. In some implementations in defining a course of action, an analyst may be provided with an interface wherein the analyst may generate a flow diagram for the various steps that operate as part of the course of action. These steps may each correspond to instructions (software, firmware, or other similar instructions) capable of implementing the desired operation, wherein the step may obtain supplemental information from one or more external services, provide comparison or decision operations, implement a configuration modification, or provide some other operation with respect to an incident in the environment. For example, a course of action may obtain geographic location information from an external service for an IP address associated with an incident, determine whether the geographic location meets defined criteria, and when the location meets the defined criteria, perform a step to modify a firewall configuration for at least one component in the computing environment (e.g. the component associated with the identified incident).

In the example of operational scenario 500, in addition to querying secondary sources for information related to an incident, incident service 510 maintains a local data store 540 capable caching data for steps executing as part of courses of action. Once the data is cached, in some examples, as part of previous queries to the external services, purge operation 525 may be used to purge or erase data from data store 540. In at least one embodiment, purge operation 525 may identify a purge event at step 1, wherein the purge event may comprise an analyst request to remove an entry in data store 540, a retrieval of new data to be cached by data store 540, an expiration of a time out period for an entry in data store 540, an access frequency associated with the data item failing to meet a threshold frequency, or some other similar purge event.

Once the purge event is identified, purge operation 525 identifies cached data associated with the purge, at step 2. In the example of operational scenario 500, purge operation 525 identifies that the entry associated with service ID 550, incident attributes 532, and data 562 should be removed from data store 540. In some implementations, the data to be removed from data store 540 may be determined based on which data incurred the expiration of the time out period, which data incurred the failure to meet the access frequency threshold (frequency of steps requesting the data), or some other similar criteria related to a data object in data store 540. In other implementations, the data to be erased may be identified based on a request from an analyst to erase data in data store 340, may be based on the least frequently accessed data in data store 540, may be based on the data type of the entries, may be based on the external service associated with the entries, or may be based on some other similar factor. As an example, if data store 540 requires a purge to provide additional memory space for new queries to external services, purge operation 525 may implement quality of service rules, wherein data of a first data type is removed before data of another data type. Similarly, the quality of service rules may purge data associated with a first service prior to erasing data for a second service. In this manner, data for the second service may be preserved and locally cached by incident service 510, while other data may be purged from data store 540.

Once the data in data store 540 is identified that is associated with the request, purge operation 525 may erase, at step 3, the data from data store 540. In some implementations, in addition to erasing the data, data store 540 may cache newly obtained data from one or more services. Accordingly, when new data is obtained, purge operation 525 may erase data from data store 540 and replace the data with the newly obtained data.

Figure 6:
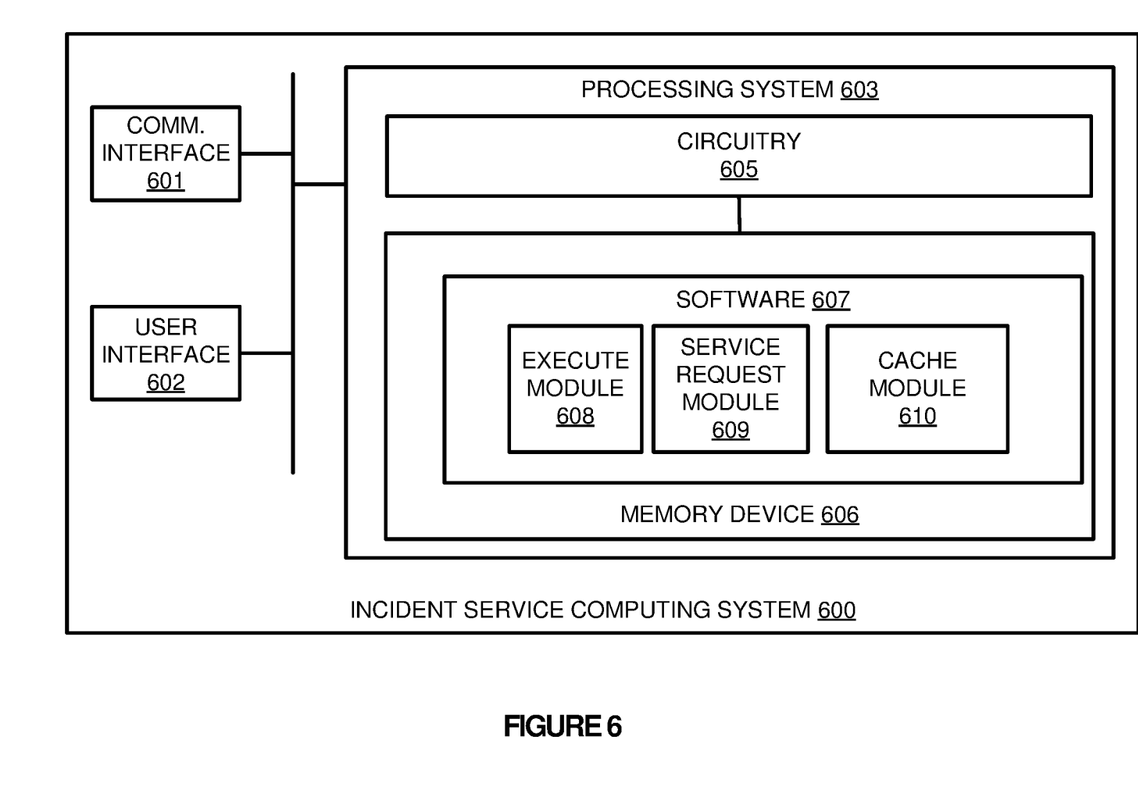
FIG. 6 illustrates an incident service computing system according to an example.

FIG. 6 illustrates an incident service computing system according to an example. Computing system 600 is representative of any computing system or systems with which the various operational architectures, processes, scenarios, and sequences disclosed herein for an incident service may be implemented. Computing system 600 is an example of incident service 120, although other examples may exist. Computing system 600 comprises communication interface 601, user interface 602, and processing system 603. Processing system 603 is linked to communication interface 601 and user interface 602. Processing system 603 includes processing circuitry 605 and memory device 606 that stores operating software 607. Computing system 600 may include other well-known components such as a battery and enclosure that are not shown for clarity.

Communication interface 601 comprises components that communicate over communication links, such as network cards, ports, radio frequency (RF), processing circuitry and software, or some other communication devices. Communication interface 601 may be configured to communicate over metallic, wireless, or optical links. Communication interface 601 may be configured to use Time Division Multiplex (TDM), Internet Protocol (IP), Ethernet, optical networking, wireless protocols, communication signaling, or some other communication format—including combinations thereof. In at least one implementation, communication interface 601 may be used to communicate analyst consoles or systems as well as computing components within an IT environment. Communication interface 601 may further communicate with external services using the internet or some other similar network.

User interface 602 comprises components that interact with a user to receive user inputs and to present media and/or information. User interface 602 may include a speaker, microphone, buttons, lights, display screen, touch screen, touch pad, scroll wheel, communication port, or some other user input/output apparatus—including combinations thereof. User interface 602 may be omitted in some examples.

Processing circuitry 605 comprises microprocessor and other circuitry that retrieves and executes operating software 607 from memory device 606. Memory device 606 may include volatile and nonvolatile, removable and non-removable media implemented in any method or technology for storage of information, such as computer readable instructions, data structures, program modules, or other data. Memory device 606 may be implemented as a single storage device but may also be implemented across multiple storage devices or sub-systems. Memory device 606 may comprise additional elements, such as a controller to read operating software 607. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 605 is typically mounted on a circuit board that may also hold memory device 606 and portions of communication interface 601 and user interface 602. Operating software 607 comprises computer programs, firmware, or some other form of machine-readable program instructions. Operating software 607 includes execute module 608, service request module 609, and cache module 610, although any number of software modules may provide a similar operation. Operating software 607 may further include an operating system, utilities, drivers, network interfaces, applications, or some other type of software. When executed by processing circuitry 605, operating software 607 directs processing system 603 to operate computing system 600 as described herein.

In one implementation, execute module 608 directs processing system 603 to execute a course of action that comprises flow operation of one or more steps. During the execution of the course of action, service request module 609 directs processing system to identify a step of the course of action that requires data from at least one service, wherein the external service may comprise a website or database external to the IT environment for computing system 600 and accessible via the internet or some other similar network.

When a step is identified in the course of action, in some examples based on a function that requests an external domain, IP address, or some other similar feature associated with an external service, service request module 609 determines whether the data required from the external service is locally cached at computing system 600. If the data is locally cached, service request module 609 may obtain the data and return the data to the requesting step. In contrast if the data is not cached, cache module 610 may obtain the data from the external service using communication interface 601 and provide the data to the requesting step.

In some implementations, cache module 610 may direct processing system 603 to manage the cache of data from the one or more secondary external services. In some examples, when data is obtained from a service cache module 610 may determine whether to cache the data in a local data store for future requests. The determination of whether to cache the data may be based on rule that defines when new data is cached, may be based on the data type or format associated with the data, may be based on the external service that was queried, or may be based on any other similar factor. In some implementations, cache module 610 may further purge or erase data from the local data store. The data may be purged based on new data being obtained from external services, based on the quantity of data in the cache store attaining a threshold, based on the expiration of a timeout period for data, based on the access frequency of for data falling below a threshold, or some other similar purge event.

Returning to the elements of FIG. 1, analyst systems 110-113, incident service 120, and service(s) 150 may each comprise communication interfaces, network interfaces, processing systems, computer systems, microprocessors, storage systems, storage media, or some other processing devices or software systems, and can be distributed among multiple devices. Examples of analyst systems 110-113, incident service 120, and service(s) 150 can include software such as an operating system, logs, databases, utilities, drivers, networking software, and other software stored on a computer-readable medium. Analyst systems 110-113, incident service 120, and service(s) 150 may comprise, in some examples, one or more server computing systems, desktop computing systems, laptop computing systems, or any other computing system, including combinations thereof.

Network 130 includes computing components 140-143, which may include physical computing systems (host computing systems, user devices, and the like), virtual computing systems, such as virtual machines and containers, routers, switches, and other similar computing systems.

Communication between analyst systems 110-113, incident service 120, service(s) 150, and components within network 130 may use metal, glass, optical, air, space, or some other material as the transport media. Communication between analyst systems 110-113, incident service 120, service(s) 150, and components within network 130 may use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication between analyst systems 110-113, incident service 120, service(s) 150, and components within network 130 may use direct links or can include intermediate networks, systems, or devices, and can include a logical network link transported over multiple physical links. In at least one implementation, incident service 120 may communicate with services 150 via the internet.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
identifying an occurrence of a first incident in an information technology (IT) environment, wherein the first incident is associated with an incident attribute;
executing, by an incident response system, a first set of actions responsive to identification of the first incident, wherein executing the first set of actions includes obtaining, from a service external to the incident response system, data related to the incident attribute;

storing the data related to the incident attribute in a data store, wherein the data store temporarily caches data obtained from a plurality of services external to the incident response system, and wherein the data is stored in the data store in association with the incident attribute and an identifier for the service from which the data was obtained;

identifying an occurrence of a second incident in the IT environment, wherein the second incident is associated with the incident attribute; and executing a second set of actions responsive to identification of the second incident, wherein executing the second set of actions includes:
- determining that the data related to the incident attribute is stored in the data store by searching the data store using the incident attribute and the identifier for the service, and
- using the data related to the incident attribute in responding to the occurrence of the second incident in the IT environment.

2. The method of claim 1 further comprising:
identifying a time out period for the data stored in the data store; and
in response to the time out period elapsing, erasing the data from the data store.

3. The method of claim 1 further comprising:
determining that a request frequency for the data fails to meet a threshold frequency; and
in response to determining that the request frequency fails to meet the threshold frequency, erasing the data from the data store.

4. The method of claim 1 further comprising:
determining that a quantity of data in the data store satisfies a threshold; and
in response to determining that the quantity of data in the data store satisfies the threshold, erasing at least a portion of the data stored in the data store.

5. The method of claim 1 further comprising:
determining whether the data meets caching criteria; and
in response to determining that the data meets caching criteria, storing the data in the data store.

6. The method of claim 1 further comprising:
determining whether the data meets caching criteria, wherein the caching criteria comprises determining whether the data is associated with at least one data type; and
in response to determining that the data meets caching criteria, caching the data in the data store.

7. The method of claim 1 further comprising:
determining whether the data meets caching criteria, wherein the caching criteria comprises determining whether the service is associated with a service identifier;
in response to determining that the data meets caching criteria, caching the data in the data store.

8. The method of claim 1, wherein the incident attribute comprises at least one addressing attribute associated with the incident.

9. The method of claim 1, wherein the incident attribute comprises a file name associated with the incident.

10. The method of claim 1, wherein the data comprises geolocation information associated with an address, file reputation information associated with a file name, or reputation information associated with a domain.

11. The method of claim 1, wherein each action of the second set of actions comprises an action to obtain supplementary data from one or more services, an action to implement a modification to a component in the IT environment, or a decision action.

12. The method of claim 1, wherein the external service comprises a website.

13. A computing apparatus comprising:
one or more non-transitory computer readable storage media;
a processing system operatively coupled to the one or more non-transitory computer readable storage media; and
program instructions stored on the one or more non-transitory computer readable storage media that, when read and executed by the processing system, direct the processing system to at least:
- identify an occurrence of a first incident in an information technology (IT) environment, wherein the first incident is associated with an incident attribute;
- execute, by an incident response system, a first set of actions responsive to identification of the first incident, wherein executing the first set of actions includes obtaining, from a service external to the incident response system, data related to the incident attribute;
- store the data related to the incident attribute in a data store, wherein the data store temporarily caches data obtained from a plurality of services external to the incident response system, and wherein the data is stored in the data store in association with the incident attribute and an identifier for the service from which the data was obtained;
- identify an occurrence of a second incident in the IT environment, wherein the second incident is associated with the incident attribute; and
- execute a second set of actions responsive to identification of the second incident, wherein executing the second set of actions includes:
  - determining that the data related to the incident attribute is stored in the data store by searching the data store using the incident attribute and the identifier of the service, and
  - using the data related to the incident attribute in responding to the occurrence of the second incident in the IT environment.

14. The computing apparatus of claim 13, wherein the program instructions further direct the processing system to:
identify a time out period for the data stored in the data store; and
in response to the time out period elapsing, erase the data from the data store.

15. The computing apparatus of claim 13, wherein the program instructions further direct the processing system to:
determine that a request frequency for the data fails to meet a threshold frequency; and
in response to determining that the request frequency fails to meet the threshold frequency, erasing the data from the data store.

16. The computing apparatus of claim 13, wherein the program instructions further direct the processing system to:
determine that a quantity of data in the data store satisfies a threshold; and
in response to determining that the quantity of data in the data store satisfies the threshold, erase at least a portion of the data stored in the data store.

17. The computing apparatus of claim 13, wherein the attribute comprises at least one addressing attribute associated with the incident.

18. The computing apparatus of claim 13, wherein the attribute comprises a file name associated with the incident.

19. The computing apparatus of claim 13, wherein the data comprises geolocation information associated with an address, file reputation information associated with a file name, or reputation information associated with a domain.

20. A non-transitory computer-readable storage medium storing instructions which, when executed by one or more processors, cause performance of operations comprising:

identifying an occurrence of a first incident in an information technology (IT) environment, wherein the first incident is associated with an incident attribute;

executing, by an incident response system, a first set of actions responsive to identification of the first incident, wherein executing the first set of actions includes obtaining, from a service external to the incident response system, data related to the incident attribute;

storing the data related to the incident attribute in a data store, wherein the data store temporarily caches data obtained from a plurality of services external to the incident response system, and wherein the data is stored in the data store in association with the incident attribute and an identifier for the service from which the data was obtained;

identifying an occurrence of a second incident in the IT environment, wherein the second incident is associated with the incident attribute; and executing a second set of actions responsive to identification of the second incident, wherein executing the second set of actions includes:

determining that the data related to the incident attribute is stored in the data store by searching the data store using the incident attribute and the identifier for the service, and using the data related to the incident attribute in responding to the occurrence of the second incident in the IT environment.

21. The non-transitory computer-readable storage medium of claim 20, wherein the instructions further cause the performance of operations comprising:

identify a time out period for the data stored in the data store; and in response to the time out period elapsing, erase the data from the data store.

22. The non-transitory computer-readable storage medium of claim 20, wherein the instructions further cause the performance of operations comprising:

determine that a quantity of data in the data store satisfies a threshold; and in response to determining that the quantity of data in the data store satisfies the threshold, erase at least a portion of the data stored in the data store.

23. The non-transitory computer-readable storage medium of claim 20, wherein the instructions further cause the performance of operations comprising:

determine whether the data meets caching criteria; and in response to determining that the data meets caching criteria, cache the data in the data store.

24. The non-transitory computer-readable storage medium of claim 20, wherein the external service comprises a website.

* * * * *